July 25, 1933.  D. B. BAKER ET AL  1,919,315
TRACK FRAME STRUCTURE
Filed Oct. 17, 1931  2 Sheets-Sheet 1
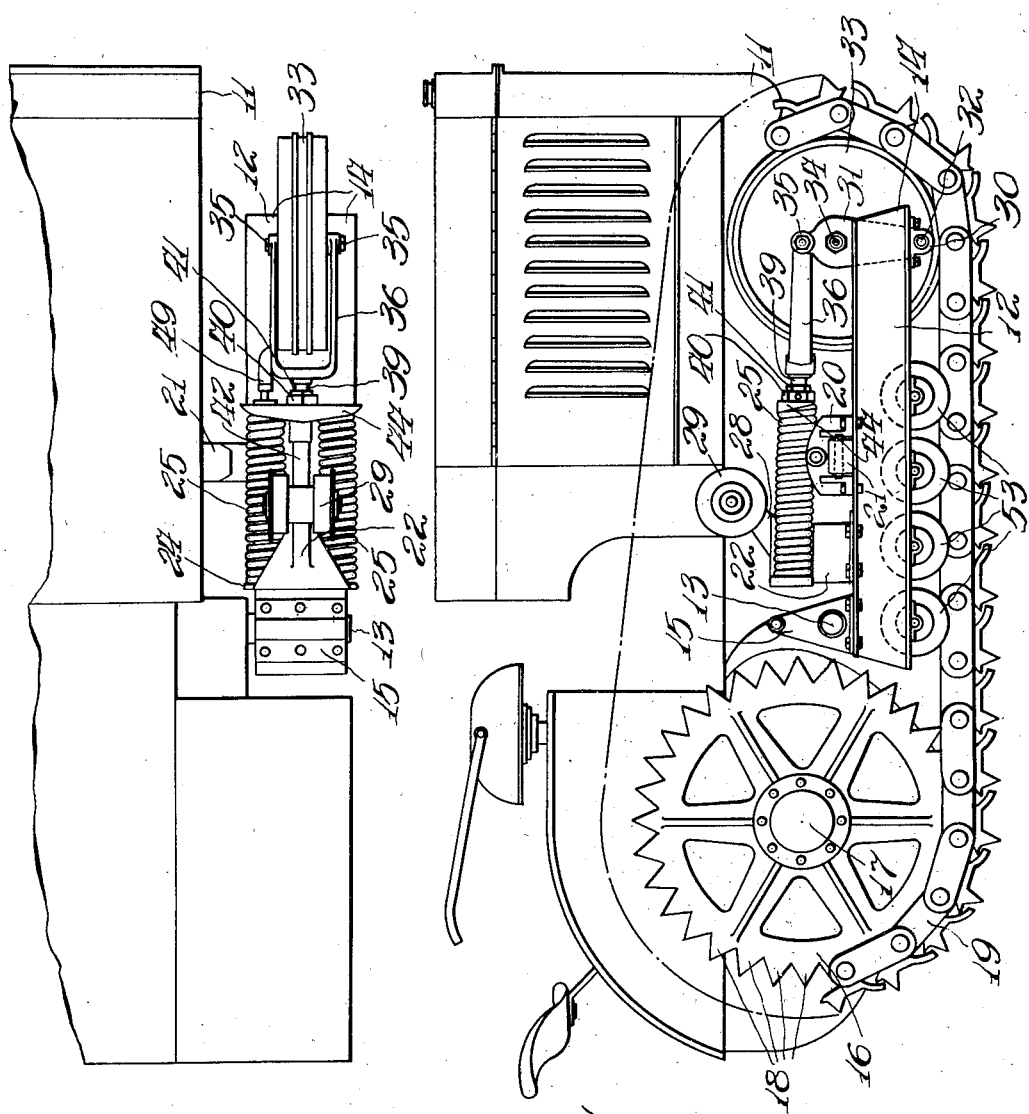
Inventors
David B. Baker
Clifford R. Rogers
Norman O. Panzegrau
By July 25, 1933.  D. B. BAKER ET AL  1,919,315
TRACK FRAME STRUCTURE
Filed Oct. 17, 1931  2 Sheets-Sheet 2
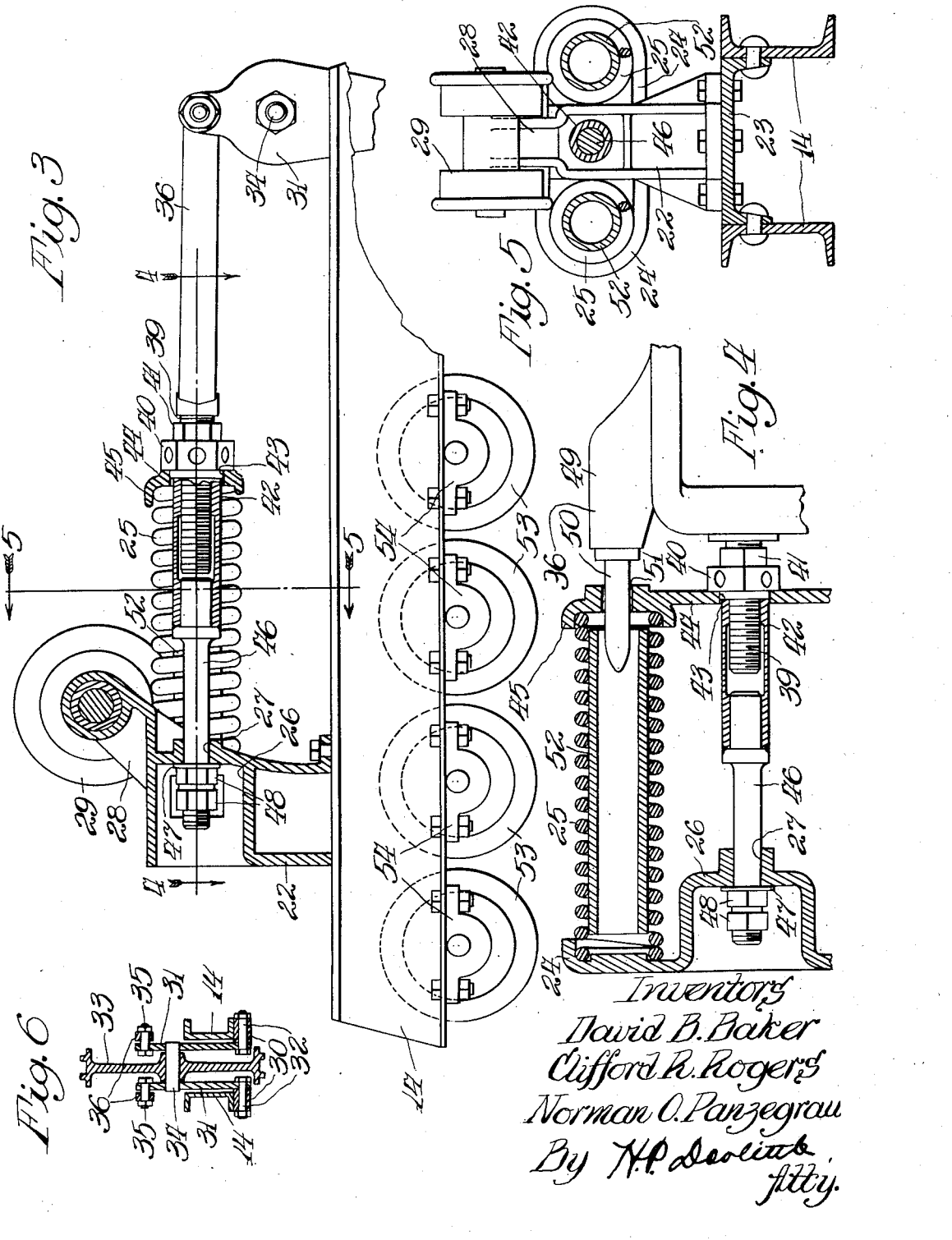

Patented July 25, 1933

1,919,315

UNITED STATES PATENT OFFICE

DAVID B. BAKER, OF RIVERSIDE, CLIFFORD R. ROGERS, OF OAK PARK, AND NORMAN O. PANZEGRAU, OF CHICAGO, ILLINOIS, ASSIGNORS TO INTERNATIONAL HARVESTER COMPANY, A CORPORATION OF NEW JERSEY

TRACK FRAME STRUCTURE

Application filed October 17, 1931. Serial No. 569,400.

This invention relates to tractors.

More particularly it relates to tractors of the track laying type.

In the use of a track laying tractor large stones or other foreign articles sometimes become lodged on the upper surface of the ground run of the track and are thereby carried between the rollers and the track, making wedging engagement therewith. To prevent breakage of the track or track rollers, resilient means have been provided to relieve abnormal stresses on the track.

The principal object of this invention is to provide an improved construction for the relief of stresses in the track without interfering with the normal action of the track. Another object is to provide means for adjusting the track carrying means without affecting the adjustment of the means for the relief of stresses. Another object is to provide an improved idler roller support construction to operate in conjunction with the improved resilient stress relief means. Another object is to provide an improved adjustment for taking up normal wear in the links making up the track chain. Other objects of the invention and the invention itself will become apparent by reference to the description of the particular embodiment disclosed and the drawings illustrating the same.

In the drawings:

Figure 1 is a side elevation of a track laying tractor embodying the invention;

Figure 2 is a plan view of a portion of the tractor shown in Figure 1, illustrating the track frame in which the invention is embodied;

Figure 3 is an enlarged side elevation of a portion of a track frame showing certain portions of the resilient stress relieving means in section;

Figure 4 is a section taken on the line 4—4 of Figure 3;

Figure 5 is a section taken on the line 5—5 of Figure 3; and

Figure 6 is an enlarged vertical section taken through the axis of the idler roller, the track chain being omitted to better show the construction of the idler roller and its mounting.

The tractor shown is of a well known type, having a main frame 11 which supports the structure comprising the radiator, the engine, the driving controls, and the operator's seat. The main frame 11 is supported on a pair of laterally disposed, forwardly extending track frames 12 by means of laterally projecting shaft ends 13. The track frames 12 consist primarily of two spaced channel bars 14, as best shown in Figure 5. Said bars are rigidly connected to a bracket 15, which provides means for securing the track frames to the shaft ends 13. At the rear of the tractor, behind the track frames 12 and substantially in alignment therewith, driving sprockets 16 are mounted on axial shafts 17 extending from the tractor. The sprockets 16 are provided with a plurality of teeth 18, over which track chains 19 extend in driving relationship with the teeth.

Intermediate the ends of the bars 12 making up the track frame, a supporting member 20 is mounted on the bars. A cross spring 21, extending under the main frame of the tractor, is pivotally connected to the members 20. The spring 21 supports the forward end of the tractor. All of the construction above described is well known in the art and is illustrated only insofar as is necessary to serve as a basis for disclosing the present invention.

Intermediate the member 20 and the bracket 15 a member 22 formed from a casting of rather intricate shape, is rigidly secured to the track frame. It is to be understood that the construction at each side of the tractor is exactly the same and that therefore only one side is shown and described. As best shown in Figure 5, the casting 22 is secured to a spacer channel 23 which is in turn secured between the channel bars 14 of the track frame. The casting 22 extends upwardly above the track frame and is provided with two lateral extensions 24, shaped to form a support and seats for compression springs 25, as shown in Figures 4 and 5. Intermediate the extensions 24, a cup-shaped forward extension 26 is formed in the casting 22. Said extension is provided with a centrally positioned opening 27 for a purpose to be hereinafter described.

An upward extension 28 of the casting 22 provides a bearing support for an idler roller 29 which is positioned to engage the upper run of the track chain.

Bearing brackets 30 are secured to the forward ends of the channel bars 14 below the lower ledges thereof. Idler roller supporting members 31 are pivotally attached to said bearing brackets by bearing pins 32, as best illustrated in Figure 6. The supporting members 31 extend upwardly inside the bars 12. An idler roller 33 is positioned between the supporting members 31 and rotatably mounted there between on a bearing shaft 34 extending through the members 31. Above said shaft the members 31 are pivotally connected by bolts 35 to a yoke 36 which extends forwardly around the idler roller 33. As shown in Figure 4, the yoke 36 is provided with an integral rearward extension 39 in alignment with the center of the roller 33. The extension 39 is threaded and an internally threaded member 40 is fitted thereon. A lock nut 41 is also threaded on the member 39 forwardly of the member 40. The member 40 has a rearwardly extending sleeve portion 42 of a reduced diameter which rotatably fits into an opening 43 formed in a spring support 44. The support 44 is formed laterally with two spring retaining portions 45 positioned in alignment with the extensions 24 formed on the casting 22. The sleeve portion 42 of the member 40 extends a substantial distance rearwardly. It is cut away internally to provide for longitudinal adjustment of the threaded member 39. At a point beyond the distance needed for adjustment of said member, the sleeve 42 is fitted over the end of a shaft 46 and welded thereto. The shaft 46 extends through the opening 27, previously described, and constitutes a guide member slidable with respect to the supporting casting 22. A washer 47 and a pair of nuts 48 are fitted on the shaft 46 on the rear side of the cup-like extension 26 whereby the shaft forms a restraining member for the springs 25 which exert pressure against the idler roller through the support 44, the yoke 36 and the associated connecting parts.

The yoke 36 is provided with an integral extension 49 having a rod-like portion 50 in alignment with the compression spring adjacent the tractor. Said rod-like portion extends through an opening 51 formed in one of the spring retaining portions 45. Said opening is concentric with respect to the spring and the portion 50 of the extension 49 is free to reciprocate internally of said spring.

Within each of the springs 25 a piece of pipe 52 of an outside diameter substantially the same as the internal diameter of the spring, is positioned to act as a stop. Said pipe is of a length substantially shorter than the dstance between the extension 24 and the spring retaining portion 45 of the support 44.

A plurality of rollers 53 are mounted along the bottom of the track frame in brackets 54. These rollers are of a conventional type for transmitting weight from the track frame to the lower run of the track chain.

In the operation of a device embodying this invention the track chain is positioned around the sprocket 16 and the idler roller 33. The roller is then pushed forwardly by adjustment of the member 40 longitudinally with respect to the shaft or guide member 46 until the roller 33 is in the proper position for holding the track in the proper position. It is to be understood that in the construction as illustrated, spring tension is not applied to the track, the roller 33 being held in a predetermined position by the action of springs against the stop, as will be hereinafter described. The springs 25 acting against the extensions 24 which serve as stops at one end and against the spring retaining portions 45 of the member 44 which serve as stops at the other end, are restrained from exerting any pressure against the idler roller structure by the retaining means consisting of the member 40, the shaft 46, and the nuts 48. The member 40 acts as a stop against the forward side of the spring retaining member 43 and the nuts 48 on the rod 46 act as a stop at the other end. It will be understood that when adjusting the member 40 compression on the springs is not altered. However, by adjusting the nuts 48 the compression of the springs may be varied. It is desirable to maintain said springs under a considerable compression so that the idler roller may not move rearwardly except under a considerable tension of the track or a considerable rearward pressure on the roller.

The pipes 52 inside the springs 25 maintain the springs in shape and provide for stops after the idler roller is moved rearwardly a predetermined distance. The extension 49, together with the portion 50 thereof, serves to hold the spring retaining support 44 in horizontal position. As the portion 50 is slidable with respect to the support 44, adjustment of the member 40 with respect to the yoke 36 may be made without tending to rotate the support. Said extension also serves to steady the yoke 36 and prevent oscillatory motion thereof.

It is to be understood that applicants have shown and described a preferred embodiment of their improved stress relieving means for track laying tractors and that they claim as their invention all modifications falling within the scope of the appended claims.

What is claimed is:

1. A cushioned idler support for track laying tractors comprising, in combination with a track frame and an idler roller rotatably mounted on one end thereof, a yoke connected to the idler roller and extending rearwardly therefrom, a support on the track frame, a restraining member slidably extending through said support and connected to said yoke, a stop on the rear end of said member to limit forward movement thereof, compression springs mounted laterally of said member and abutting at one end against said support, a spring retaining member mounted on the restraining member and abutting the other ends of the springs, and means for adjusting the restraining member longitudinally of the yoke member.

2. A device as set forth in claim 1, in which means are provided for longitudinally adjusting the position of the stop on the restraining member.

3. A cushioned idler support for track laying tractors comprising, in combination with a track frame spaced upwardly extending members pivoted to said track frame, an idler roller rotatably mounted between said members intermediate their ends, a yoke connected to the upper ends of said members and extending rearwardly therefrom, a support on the track frame, a pair of compression springs abutting said support and extending forwardly therefrom substantially in alignment with the members to which the yoke is attached, a retaining member abutting the forward ends of said springs, and means for adjustably connecting said retaining member to the yoke.

4. A device as set forth in claim 3, in which means are provided for connecting the spring retaining member to the support on the track frame for maintaining said springs under a predetermined compression and to restrain said springs from exerting pressure on the idler roller.

5. A cushioned idler support for track laying tractors comprising, in combination with a track frame and an idler roller rotatably mounted on one end thereof, a yoke connected to the idler roller and extending rearwardly therefrom, a support on the track frame, a guide member slidable with respect to said support and connected to said yoke, compression springs mounted laterally of said member and abutting at one end against said support, a spring retaining member mounted on the guide member and abutting the other ends of the springs, an element rigidly mounted on the yoke member and engaging the spring retaining member to prevent rotation of said member, and means for adjusting the guide member longitudinally of the yoke member.

6. A cushioned idler support for track laying tractors comprising, in combination with a track frame and an idler roller rotatably mounted on one end thereof, a yoke connected to the idler roller and extending rearwardly therefrom, a support on the track frame, a guide member slidable with respect to said support and connected to said yoke, compression springs mounted laterally of said member and abutting at one end against said support, a spring retaining member mounted on the guide member and abutting the other ends of the springs, an element rigidly mounted on the yoke member slidably engaging the spring retaining member to prevent rotation of said member and to allow adjustment of the yoke member with respect to the guide member, and means for adjusting the guide member longitudinally of the yoke member.

DAVID B. BAKER.
CLIFFORD R. ROGERS.
NORMAN O. PANZEGRAU.